United States Patent
Tanabe (10) Patent No.: US 10,637,150 B2
(45) Date of Patent: *Apr. 28, 2020

(54) RADIO WAVE REFLECTION DEVICE

(71) Applicant: NEC Corporation, Tokyo (JP)

(72) Inventor: Kosuke Tanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 722 days.

This patent is subject to a terminal disclaimer.

(21) Appl. No.: 15/104,674

(22) PCT Filed: Oct. 17, 2014

(86) PCT No.: PCT/JP2014/005284
§ 371 (c)(1),
(2) Date: Jun. 15, 2016

(87) PCT Pub. No.: WO2015/097954
PCT Pub. Date: Jul. 2, 2015

(65) Prior Publication Data
US 2016/0315392 A1    Oct. 27, 2016

(30) Foreign Application Priority Data
Dec. 26, 2013    (JP) ................. 2013-269028

(51) Int. Cl.
*E04G 3/00*    (2006.01)
*H01Q 15/14*    (2006.01)
(Continued)

(52) U.S. Cl.
CPC .......... *H01Q 15/14* (2013.01); *H01Q 1/1228* (2013.01); *H01Q 3/08* (2013.01); *H01Q 3/20* (2013.01);
(Continued)

(58) Field of Classification Search
CPC ........ H01Q 15/14; H01Q 1/1228; H01Q 3/20; H01Q 15/18; H01Q 19/104; H01Q 19/185
(Continued)

(56) References Cited

U.S. PATENT DOCUMENTS

| 5,697,063 A | 12/1997 | Kishigami et al. |
| 5,964,439 A * | 10/1999 | Johnson .................... A61G 5/10 |
| | | 248/278.1 |

(Continued)

FOREIGN PATENT DOCUMENTS

| GB | 945859 A * | 1/1964 | .......... H01Q 19/104 |
| JP | S58-073205 A | 5/1983 | |

(Continued)

OTHER PUBLICATIONS

International Search Report corresponding to PCT/JP2014/005284, dated Dec. 22, 2014 (5 pages).

(Continued)

*Primary Examiner* — Gwendolyn W Baxter
(74) *Attorney, Agent, or Firm* — Wilmer Cutler Pickering Hale and Dorr LLP (57) ABSTRACT

A mounting unit (210) securely mounts a radio wave reflection device (200) on a stable installation place such as a pole (20). A reflector unit (300) holds two reflectors (350, 360) at a tilt angle of 45°, allowing the two reflectors (350, 360) to be coaxial and rotatable independently of each other. A joint unit (220) connects the reflector unit (300) and the mounting unit (210). The joint unit (220) has rotational freedom along two axes (AZ axis and EL axis) orthogonal to each other. A radio wave reflecting device that relays, by reflection, radio communications between a first antenna device and a second antenna device distant from each other is thereby provided.

8 Claims, 11 Drawing Sheets

(51) Int. Cl.
*H01Q 19/10* (2006.01)
*H01Q 15/18* (2006.01)
*H01Q 3/08* (2006.01)
*H04B 7/145* (2006.01)
*H01Q 3/20* (2006.01)
*H01Q 1/12* (2006.01)
*H01Q 19/185* (2006.01)

(52) U.S. Cl.
CPC ........... *H01Q 15/18* (2013.01); *H01Q 19/104* (2013.01); *H01Q 19/185* (2013.01); *H04B 7/145* (2013.01)

(58) Field of Classification Search
USPC ........... 248/230.5, 542, 278.1; 343/839, 840, 343/912
See application file for complete search history.

(56) References Cited

U.S. PATENT DOCUMENTS

| | | | | |
|---|---|---|---|---|
| 6,264,152 B1 * | 7/2001 | Bloch | ................... | F16M 11/126 248/274.1 |
| 6,484,987 B2 * | 11/2002 | Weaver | ................... | F16M 11/10 248/278.1 |
| 9,728,861 B2 * | 8/2017 | Tanabe | ................... | H01Q 3/20 |
| D796,491 S * | 9/2017 | Nealis | ................... | D14/230 |
| 2006/0152410 A1 | 7/2006 | Shi | | |
| 2012/0206299 A1 | 8/2012 | Valdes-Garcia | | |

FOREIGN PATENT DOCUMENTS

| | | | |
|---|---|---|---|
| JP | H05-206946 A | | 8/1993 |
| JP | H07-154320 A | | 6/1995 |
| JP | H07-250024 A | | 9/1995 |
| JP | H09-051293 A | | 2/1997 |
| JP | H10-093333 A | | 4/1998 |
| JP | 2002-084115 A | | 3/2002 |
| JP | 2002-135017 A | | 5/2002 |
| JP | 3108453 U | | 4/2005 |
| JP | 2006-245886 A | | 9/2006 |
| JP | 2007-299232 A | | 11/2007 |
| JP | 2012078319 A | * | 4/2012 |
| JP | 2012-199617 A | | 10/2012 |
| WO | WO-02/095871 A1 | | 11/2002 |

OTHER PUBLICATIONS

Extended European Search Report issued by the European Patent Office for European Application No. 14874352.9 dated Jul. 31, 2017 (8 pages).

* cited by examiner

RADIO WAVE REFLECTION DEVICE

CROSS-REFERENCE TO RELATED APPLICATIONS

This application is a national stage application of International Application No. PCT/JP2014/005284 entitled "Radio Wave Reflection Device," filed on Oct. 17, 2014, which claims priority to Japanese Patent Application No. 2013-269028, filed on Dec. 26, 2013. The disclosures of each which are hereby incorporated by reference in their entirety.

TECHNICAL FIELD

The present invention relates to a radio wave reflection device. Specifically, the present invention relates to a radio wave reflection device that relays radio waves for wireless communications by means of reflection.

BACKGROUND ART

As a wireless system for mobile backhaul, a point-to-point system using parabolic antennas is used. Because it is necessary to provide an unobstructed view between the antennas to achieve favorable communications, the antennas are often placed in a high position in order to obtain an unobstructed view.

Cells for mobile base stations tend to decrease in size, such as picocells and femtocells. Accordingly, a base station needs to be placed at a lower position; however, an environment with an unobstructed view cannot be obtained when antennas are placed at lower positions in an urban area, which makes it difficult to implement point-to-point wireless communications. Techniques to overcome this problem by relaying radio waves by reflection on a reflector in the situation where there is an unobstructed view between two antennas are known (Patent Literature 1 to 6).

CITATION LIST

Patent Literature

PTL1: Japanese Unexamined Patent Publication No. S58-73205
PTL2: Japanese Unexamined Patent Publication No. H07-154320
PTL3: Japanese Unexamined Patent Publication No. 2007-299232
PTL4: Japanese Unexamined Patent Publication No. 2006-245886
PTL5: Japanese Utility Model No. 3108453
PTL6: Japanese Unexamined Patent Publication No. 2012-199617

SUMMARY OF INVENTION

Technical Problem

The methods of relaying radio waves by reflection disclosed in the above literature simply relay radio waves using one reflector. It is possible with one reflector to reflect radio waves so as to divert the waves around an obstacle. However, in the case of reflecting radio waves with one reflector, it is difficult to achieve high reflection intensity when the angle of incidence is large, and in such a case it is necessary to use a significantly large reflector to obtain sufficient reflection intensity.

Further, although it is possible to relay radio waves by reflection in principle, it is very difficult in practice to adjust the angle of a reflector and set it up so as to obtain a good reception level. Patent Literature 4 to 6 disclose a solid plate reflector with a mechanism capable of angle adjustment, and it is possible in theory to make a fine adjustment of the angle of the reflector to obtain the maximum reception level by using such an angle adjustment mechanism.

However, assume a case where, for example, a reflector is placed so as to relay radio waves between a first antenna and a second antenna. In this case, it would be necessary to try to maximize the reception level of the second antenna by making various changes in the orientation of the first antenna, the orientation of the reflector and the orientation of the second antenna. There are at least three parameters: the orientation of the first antenna, the orientation of the reflector and the orientation of the second antenna, each of which is a vector in a three-dimensional space. As a practical matter, it would be almost impossible to adjust these orientations by trial and error, checking the reception level each time.

An exemplary object of the present invention is to provide a radio wave reflection device that can relay radio waves at a sufficient reflection intensity. Further, another exemplary object of the present invention is to provide a radio wave reflection device that can adjust the direction easily and accurately.

Solution to Problem

A radio wave reflection device according to the exemplary aspects of the present invention is a radio wave reflection device that relays, by reflection, radio communications between a first antenna device and a second antenna device distant from each other, including a mounting unit that securely mounts the radio wave reflection device on a stable installation place, a reflector unit that holds two reflectors, and a joint unit that connects the reflector unit and the mounting unit, wherein the two reflectors are respectively held at a specified tilt angle with respect to support shafts, have reflective surfaces facing each other, are coaxial with each other, and at least one of the two reflectors is rotatable about the support shaft, and the joint unit has rotational freedom along two axes orthogonal to each other.

A method for installing a radio wave reflection device according to the exemplary aspects of the present invention is a method for installing a radio wave reflection device that relays, by reflection, radio communications between a first antenna device and a second antenna device distant from each other, the radio wave reflection device including a mounting unit that securely mounts the radio wave reflection device on a stable installation place, a reflector unit that holds two reflectors at a tilt angle of 45° and which reflectors are coaxial and rotatable independently of each other, and a joint unit that connects the reflector unit to the mounting unit and has rotational freedom along two axes orthogonal to each other, the method including measuring a direction of the first antenna device and a direction of the second antenna device, specifying a plane of incidence defined by the first antenna device, the second antenna device and the radio wave reflection device, adjusting an angle of the joint unit so that a normal to the plane of incidence and a rotational axis of the two reflectors coincide with each other, and pointing the two reflectors respectively in the direction of the first antenna device and the direction of the second antenna device.

Advantageous Effects of Invention

According to the exemplary aspects of the present invention, it is possible to provide a radio wave reflection device that relays radio communications between a first antenna device and a second antenna device at a sufficient reflection intensity.

DESCRIPTION OF EMBODIMENTS

Exemplary embodiments of the present invention are illustrated in drawings and described with reference to symbols denoting elements in the drawings.

First Exemplary Embodiment

A first exemplary embodiment of the present invention is described hereinafter.

Figure 1:
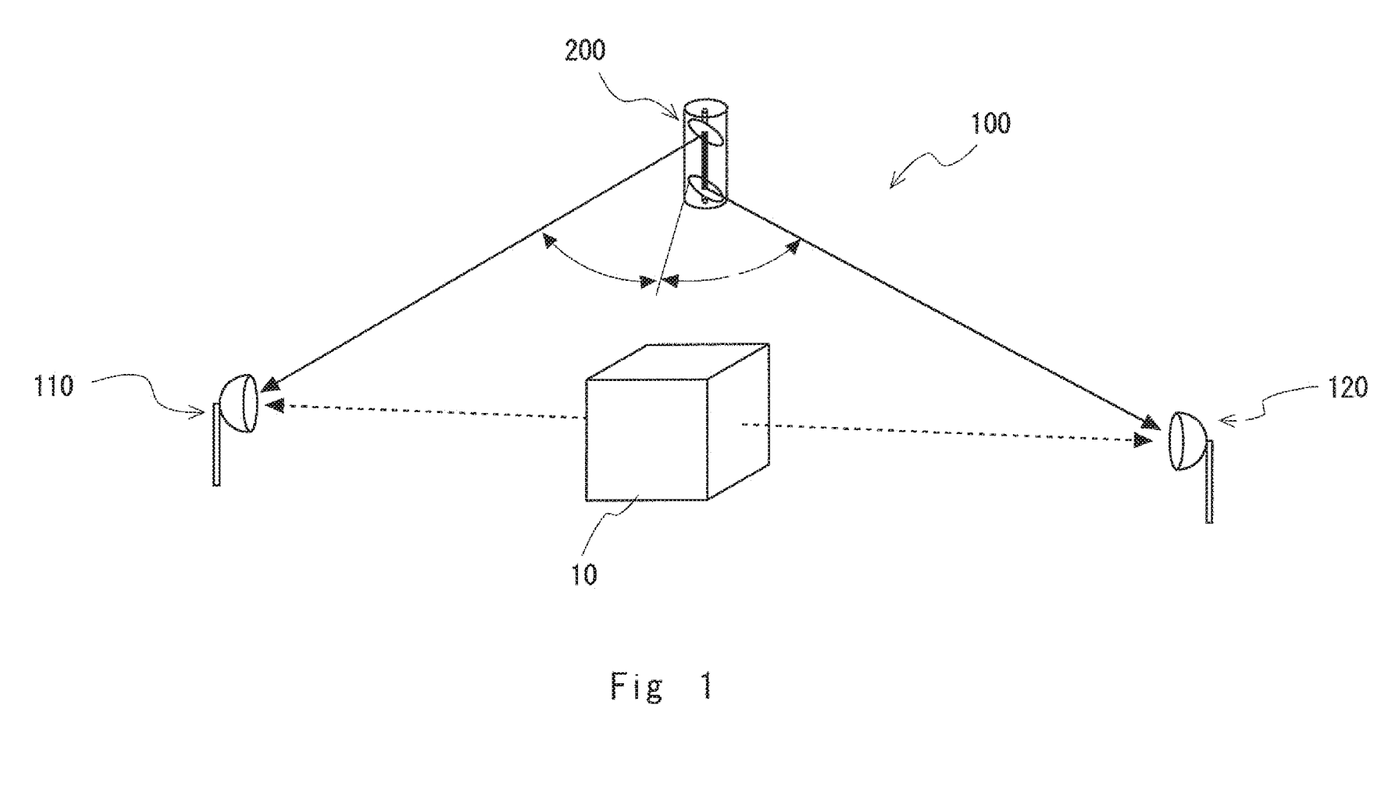
FIG. 1 is a view showing a communication system.

FIG. 1 shows a communication system 100.

The communication system 100 includes a first antenna device 110 and a second antenna device 120, and transmits and receives communication radio waves between the first antenna device 110 and the second antenna device 120. The first antenna device 110 and the second antenna device 120 transmit and receive radio waves by directional antennas such as parabolic antennas. Note that, in view of a demand for a rapid increase in channel capacity, a wider bandwidth, a higher frequency and the like, today radio waves have wavelengths of millimeters, and the beam width is extremely narrow.

It is assumed that there is no direct view between the first antenna device 110 and the second antenna device 120 due to an obstacle 10 between the first antenna device 110 and the second antenna device 120. The obstacle 10 is typically an artificial structure like a house or a building, though it may be a mountain or the like. Given this situation, a radio wave reflection device 200 is placed as a part of the communication system 100, so that the radio wave reflection device 200 reflects radio waves to divert the waves around the obstacle 10. Point-to-point communications are thereby implemented between the first antenna device 110 and the second antenna device 120. This exemplary embodiment is characterized in the structure of the radio wave reflection device 200 and a method of appropriately installing the radio wave reflection device 200.

This above structure and method are described hereinafter.

Figure 2:
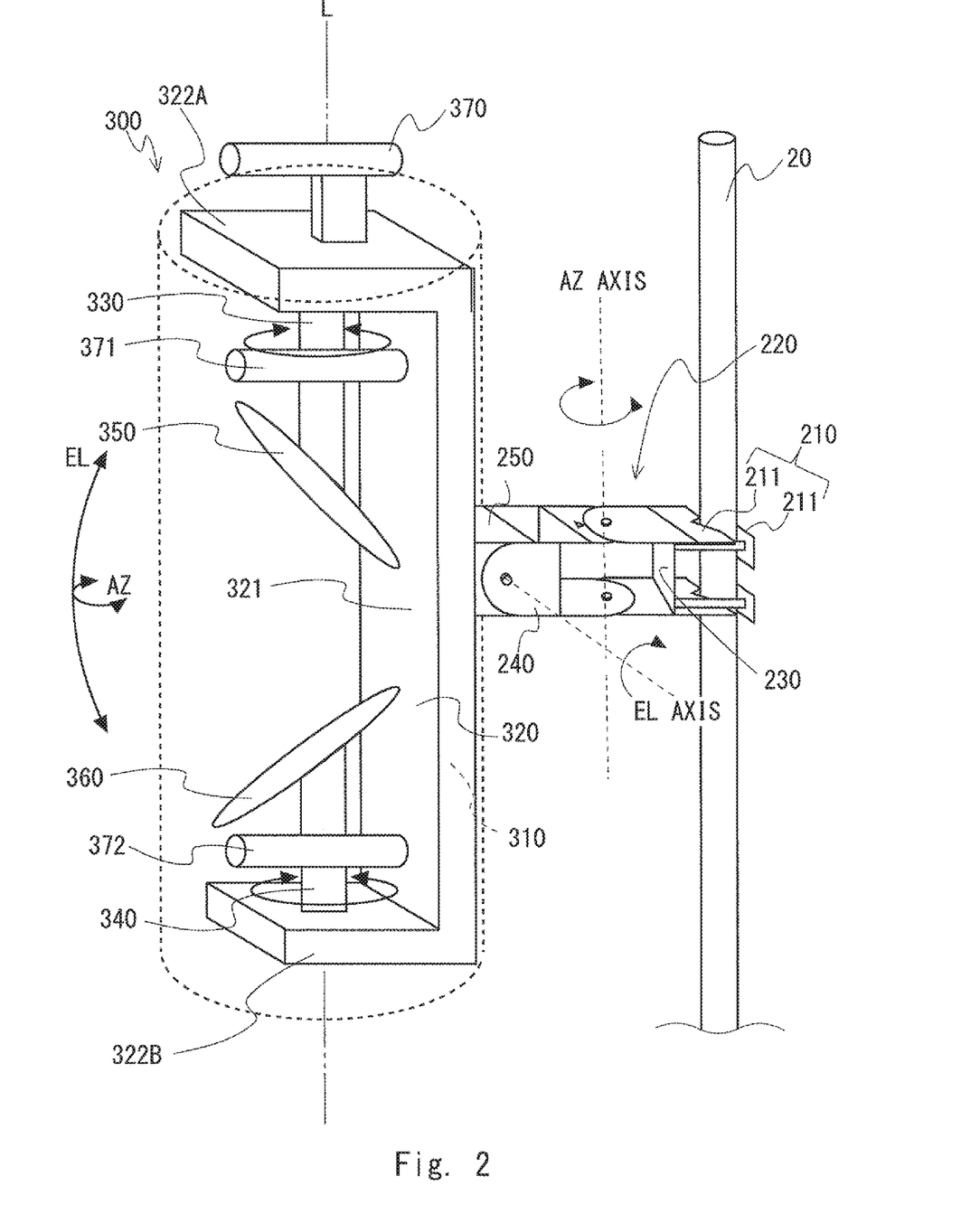
FIG. 2 is a view showing a radio wave reflection device.

FIG. 2 shows the radio wave reflection device 200.

The radio wave reflection device 200 includes a mounting unit 210, a joint unit 220, and a reflector unit 300.

Ideally, the radio wave reflection device 200 is placed at a high position, and, it is supported at the high position by use of a pole 20 or a building. In FIG. 2, the pole 20 is placed to support the radio wave reflection device 200 at a high position. The structure of the mounting unit 210 is not particularly limited as long as it can securely mount the radio wave reflection device 200 on the pole 20. For example, the mounting unit 210 may have a structure to hold the pole 20 by two plates 211 and 211, as shown in FIG. 2.

Figure 3:
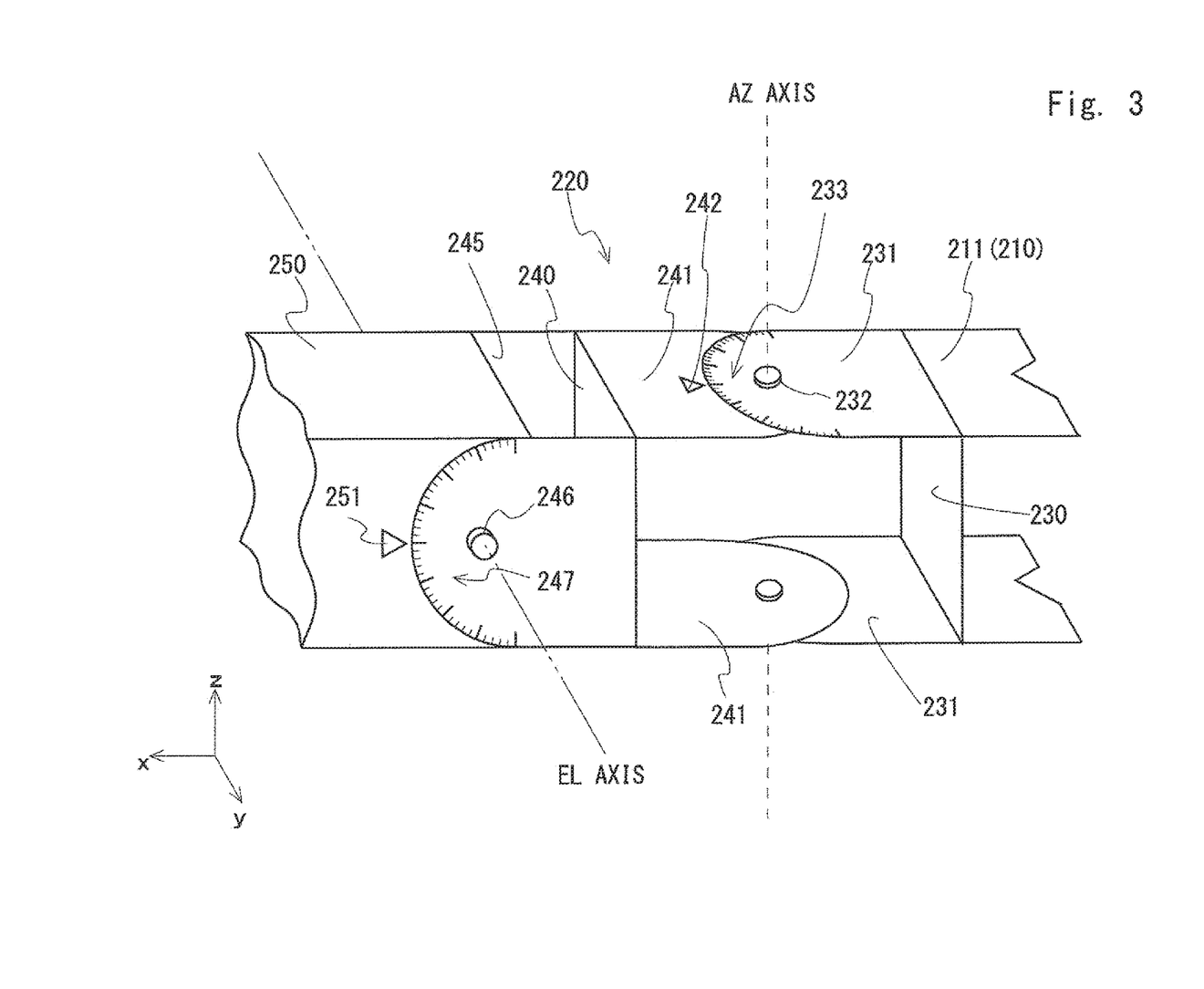
FIG. 3 is a view showing the structure of a joint unit.

The joint unit 220 connects the mounting unit 210 and the reflector unit 300 so that the posture of the reflector unit 300 can be changed with respect to the mounting unit 210 (or the pole 20). The joint unit 220 may be a universal joint, which is well known, and preferably, it has a scale that measures both the azimuth angle and the elevation angle and that is easy to read. Thus, the structure of the joint unit 220 preferably has rotational freedom along two axes orthogonal to each other. Although a universal joint with a cross spider can be used from this perspective, a joint structure in which the AZ axis (vertical axis) and the EL axis (horizontal axis) are separated as shown in FIG. 3 is more preferable.

The joint unit 220 has two axes that are orthogonal to each other as rotational axes. (To be exact, the two axes are not "orthogonal" but are spatially skewed. The two axes become orthogonal when one axis is projected to overlap the other axis.)

When installing the radio wave reflection device 200, it is preferred to make an adjustment so that one of the two axes is oriented vertically and the other axis is oriented horizontally. Thus, the vertical axis is referred to as the AZ axis, and the horizontal axis is referred to as the EL axis. Thus, by the rotation about the AZ axis, the azimuth angle of the reflector unit 300 changes. By the rotation about the EL axis, the elevation angle of the reflector unit 300 changes.

The angles are referred to as follows. Although it is general that the positive angle from horizontal is referred as the elevation angle and the negative angle from horizontal is referred as the depression angle with respect to the horizontal plane, the angle in the pitch direction is referred to as the elevation angle in this specification without differentiating the depression angle from the elevation angle. Further, for example, the angle from the vertical line, not with respect to the horizontal plane, is also referred to as the elevation angle.

In FIG. 3, the joint unit 220 includes a fixed part 230 that is formed integrally with the mounting unit 210, a rotating part 240 that is held (rotatably supported) by the fixed part 230 with respect to the AZ axis as a rotational axis, and a coupling unit 250 formed integrally with the backside of the reflector unit 300 and held (rotatably supported) by the rotating part 240 with respect to the EZ axis as a rotational axis.

The fixed part 230 has two support pieces 231 and 231 that are shaped like the letter L from the base surface when viewed from the side, and the two support pieces 231 and 231 are parallel to and opposite to each other with a specified gap therebetween. The specified gap is the interval along the AZ axis (vertical axis). Each of the two support pieces 231 and 231 has a hole 232 (which may be a projection or a depression) on one virtual line along the AZ axis (vertical axis) to rotatably support the rotating part 240. As shown in FIG. 3, a scale 233 for measuring an angle is engraved on the outer surface of the support piece 231. This angle scale 233 is an angle scale for measuring the azimuth (AZ) angle. A part of the outer edge of the support piece 231 is arc-shaped so that the relative angle position of a reference mark 242 placed on the rotating part 240 can be easily read.

The rotating part 240 has two coupling pieces 241 and 241 on the backside of the base surface and has two support pieces 245 and 245 on the front side thereof. The side of the rotating part 240 which faces the reflector unit 300 is referred to as the front side, and the side of the rotating part 240 which faces the mounting unit 210 is referred to as the backside. The coupling pieces 241 and 241 are shaped like the letter L from the base surface when viewed from the side and rotatably supported by the support pieces 231 and 231 of the fixed part 230. Because the coupling pieces 241 and 241 are rotatably supported by the support pieces 231 and 231 of the fixed part 230, the rotating part 240 can rotate in the azimuth (AZ) direction. The outer surface of the coupling piece 241 has the reference mark 242 which indicates the relative angle position to the angle scale 233 for measuring the azimuth angle (AZ). When placing the reference mark 242 on the outer surface of the coupling piece 241, the reference mark 242 may be engraved on the outer surface of the coupling piece 241, or it may be a detachable sticker.

The support piece 245 is shaped like the letter L from the base surface when viewed from the front, and the two support pieces 245 and 245 are parallel to and opposite to each other along the EL axis (horizontal axis) with a specified gap therebetween. Each of the two support pieces 245 and 245 has a hole 246 (which may be a projection or a depression) on one virtual line along the EL axis (horizontal axis) to rotatably support the coupling unit 250. A scale 247 for measuring an angle is engraved on the outer surface of each of the support pieces 245. This angle scale 247 is an angle scale for measuring the elevation angle (EL). A part of the outer edge of each of the support pieces 245 and 245 is arc-shaped so that the relative angle position of a reference mark 251 placed on the coupling unit 250 can be easily read.

When placing the reference mark 251 on the outer surface of the coupling unit 250, the reference mark 251 may be engraved, or it may be a detachable sticker.

With the joint unit 220 having the above structure, it is possible to change the azimuth angle and the elevation angle of the reflector unit 300 independently of one another and it is also possible to read the azimuth angle and the elevation angle independently of one another.

The structure of the reflector unit 300 is described hereinafter.

The reflector unit 300 includes a radome 310, a support frame 320, a first support shaft (rotating support shaft) 330, a second support shaft (rotating support shaft) 340, a first reflector 350, a second reflector 360, and three scopes (collimators). (Note that, in FIG. 2, the radome 310 is shown by a chain line so that the inside of the radome 310 is visible.)

The support frame 320 is U-shaped with right angled corners as a whole. Specifically, the support frame 320 has a U-shape with right angled corners as a whole with support arms 322A and 322B extending horizontally from the upper and lower ends of a column 321 located vertically. The upper support arm is referred to as a first support arm 322A, and the lower support arm is referred to as a second support arm 322B. When the side of the column 321 from which the support arms 322A and 322B extend is the front side, and the opposite side is the backside, the backside of the column 321 serves as the coupling unit 250 and is supported axially by the rotating part 240 of the joint unit 220. In the space between the first support arm 322A and the second support arm 322B of the support frame 320, the space has the column 321 in one direction corresponding to the backside, and the space is open in the other directions, thereby letting radio waves in and out over a wide angle.

The first support shaft 330 is placed to hang down vertically from the first support arm 322A. Further, the first support shaft 330 is borne by the first support arm 322A so that it can rotate about its axis line as the rotational axis. The second support shaft 340 is placed to rise from the second support arm 322B. Further, the second support shaft 340 is borne by the second support arm 322B so that it can rotate about its axis line as the rotational axis. The axis line (rotational axis) of the first support shaft 330 and the axis line (rotational axis) of the second support shaft 340 are designed to be on one virtual axis line. (Thus, the first support shaft 330 and the second support shaft 340 are coaxial to each other.) This virtual axis line is referred to as a main axis line L of the reflector unit 300.

Figure 4:
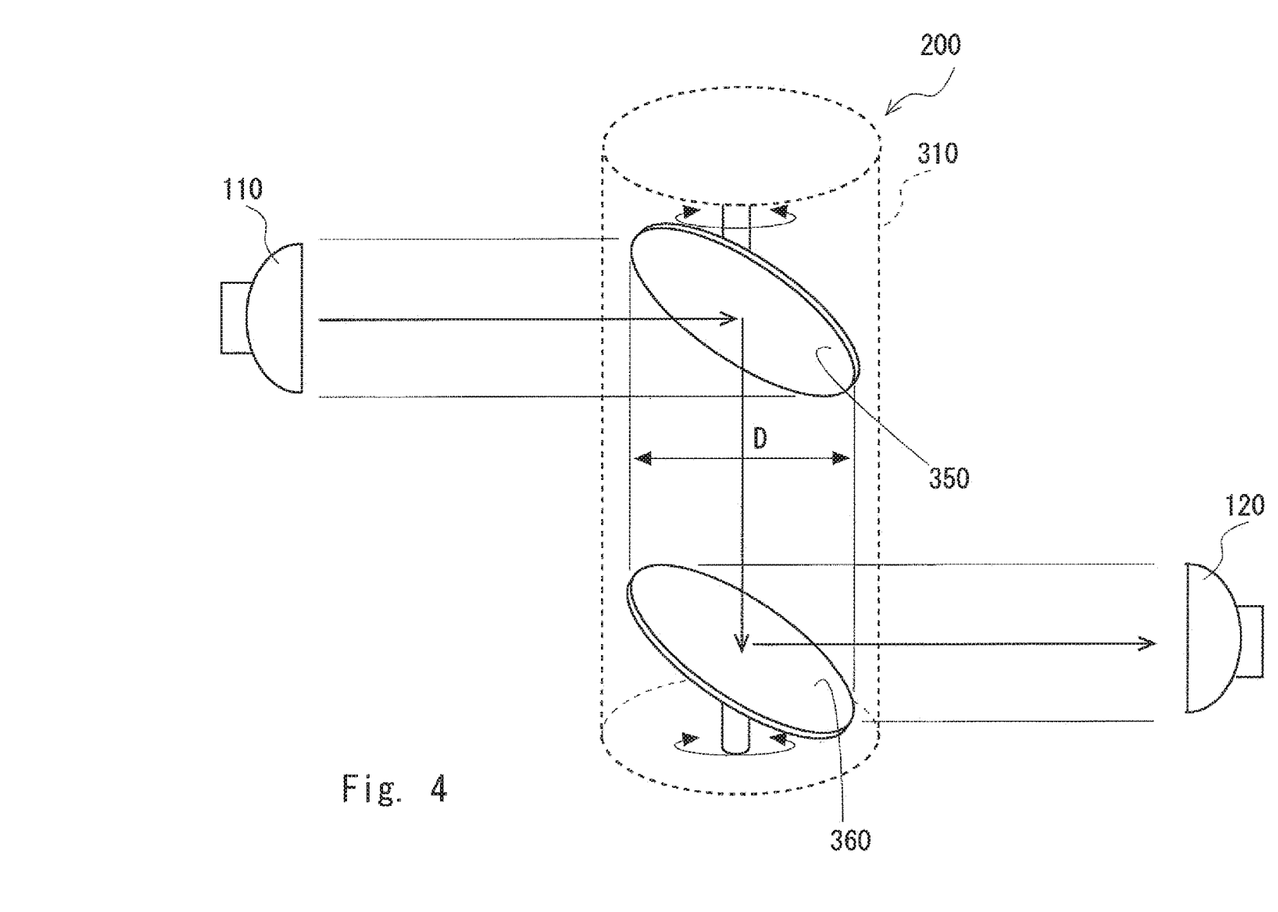
FIG. 4 is a view illustrating the path of radio waves in a reflection unit.

The first reflector 350 is fixed to the first support shaft 330 at a specified tilt angle. In this example, the first reflector 350 is fixed to the first support shaft 330 at a tilt angle of 45°. Likewise, the second reflector 360 is fixed to the second support shaft 340 at a specified tilt angle. To be specific, the second reflector 360 is fixed to the second support shaft 340 at a tilt angle of 45°. The reflective surfaces of the first reflector 350 and the second reflector 360 are substantially face to face, though not actually "opposite" to each other because they are tilted at 45°. Thus, as shown in FIG. 4, it is possible to reflect radio waves emitted from one antenna device (the first antenna device 110) by the first reflector 350 to let them enter the second reflector 360, and further reflect them by the second reflector 360 toward the other antenna device (the second antenna device 120). Note that, however, it is necessary to accurately adjust the orientation of the main axis line L of the reflector unit 300 in order to relay radio waves between the first antenna device 110 and the second antenna device 120 through such a reflection path, which is described later.

The three scopes are respectively referred to as a main scope 370, a first scope 371, and a second scope 372. The main scope 370 is fixed to the support frame 320, and therefore the main scope 370 and the support frame 320 are displaced together. In other words, the main scope 370 is displaced together with the whole reflector unit 300.

When mounting the main scope 370 on the support frame 320, it is placed so that the optical axis of the main scope 370 is orthogonal to the main axis line L of the reflector unit 300. (To be exact, the optical axis of the main scope 370 and the main axis line L of the reflector unit 300 may be spatially skewed, not "orthogonal" to each other; however, in this case also, it is preferred that the two axes become orthogonal when the optical axis of the main scope 370 is projected to overlap the main axis line L of the reflector unit 300.) Although the significance of this arrangement will become apparent in an angle adjustment procedure described later, briefly this significance is as follows. Because the first reflector 350 and the second reflector 360 are arranged to be tilted at 45°, it is possible to relay radio waves from the first antenna device 110 to the second antenna device 120 when the plane of incidence defined by the first antenna device 110, the second antenna device 120 and the radio wave reflection device 200 and the main axis line L of the reflector unit 300 become orthogonal to each other. It is thus necessary to adjust the posture of the reflector unit 300 so that the main axis line L of the reflector unit 300 becomes orthogonal to the plane of incidence. If the optical axis of the main scope 370 and the main axis line L of the reflector unit 300 are orthogonal to each other, it is easy to adjust the orientation of the main axis line L of the reflector unit 300 by use of the main scope 370.

Although the direction toward which the sight line of the main scope is pointed is not particularly significant, it would be natural and user-friendly to align the direction in which the support arms 322A and 322B extend and the direction of the sight line of the main scope 370, judging from the shape of the reflector unit 300 as a whole.

The first scope 371 is attached to the first support shaft 330, and the second scope 372 is attached to the second support shaft 340. They are mounted so that the optical axis of the first scope 371 is orthogonal to the first support shaft 330, and the optical axis of the second scope 372 is orthogonal to the second support shaft 340.

It is necessary to align the orientation of the surface of each reflector and the orientation of the optical axis of each scope. For this purpose, the normal to the reflector and the optical axis of the scope are designed to be contained in the same virtual plane. Stated differently, the optical axis of the scope intersects the virtual plane containing the reflector at 45°. The important point is that a point at which the scope is aimed serves as the point of transmission or reception of radio waves.

Figure 5:
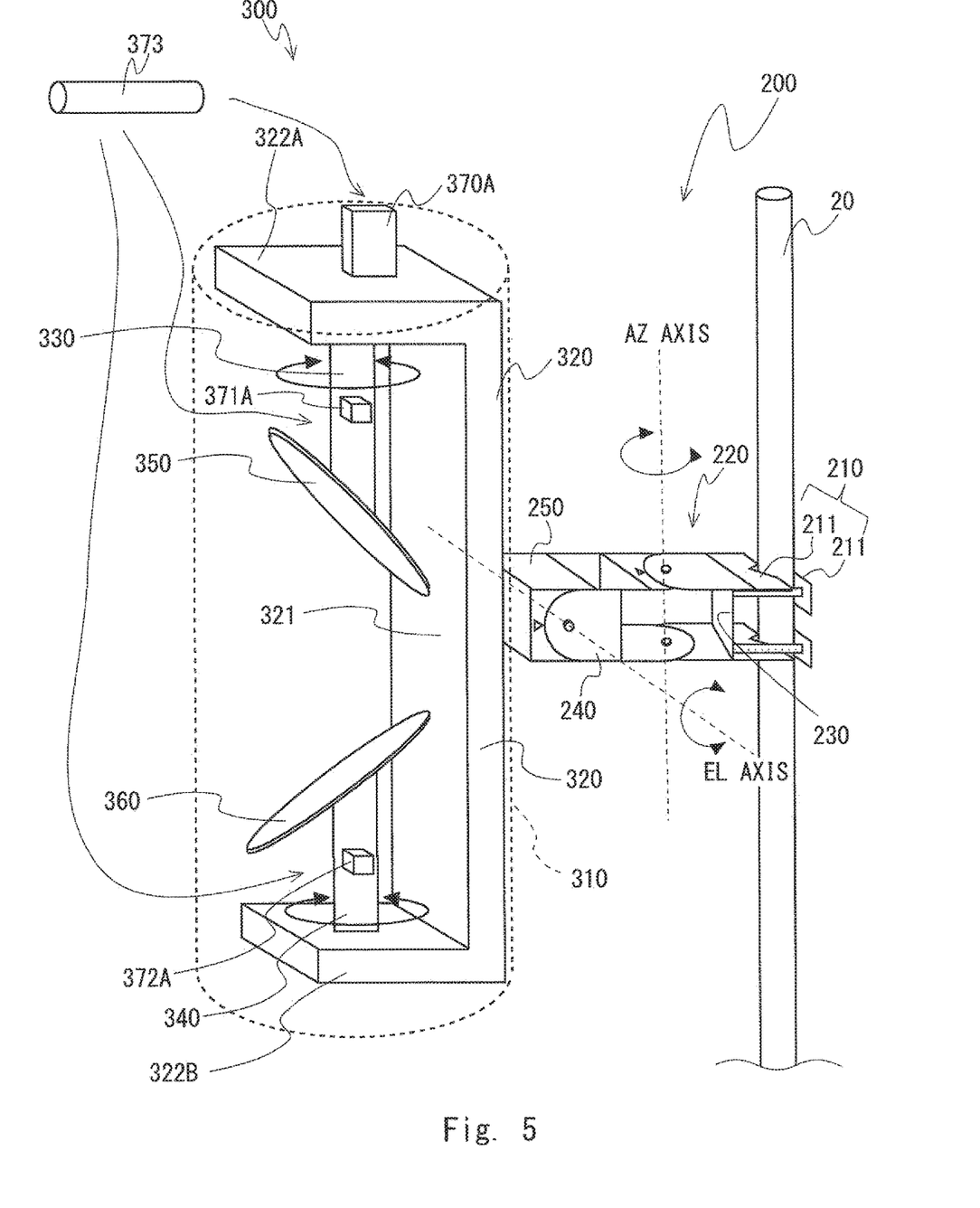
FIG. 5 is a view showing a detachable scope.

Note that, the main scope, the first scope and the second scope are not necessarily used simultaneously. Instead, they may be used sequentially, as is described later in the angle adjustment procedure. Thus, as shown in FIG. 5, it is feasible to place mounting units 370A, 371A and 372A for attaching and detaching the main scope 370, the first scope 371 and the second scope 372, respectively, and attach one scope 373 to a specified position each for use.

Installation Procedure of Radio Wave Reflection Device 200

An installation procedure of the radio wave reflection device 200 is described hereinafter.

Figure 6:
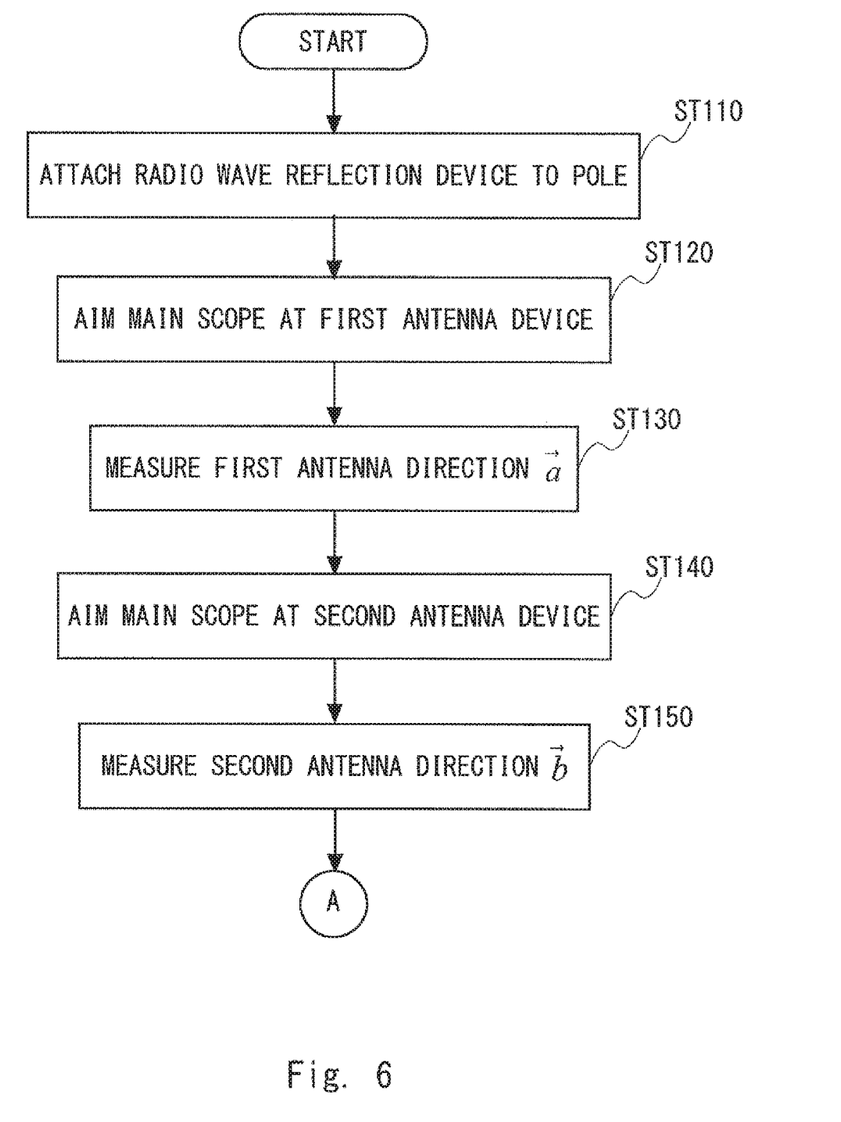
FIG. 6 is a flowchart showing an installation procedure of the radio wave reflection device.
Figure 7:
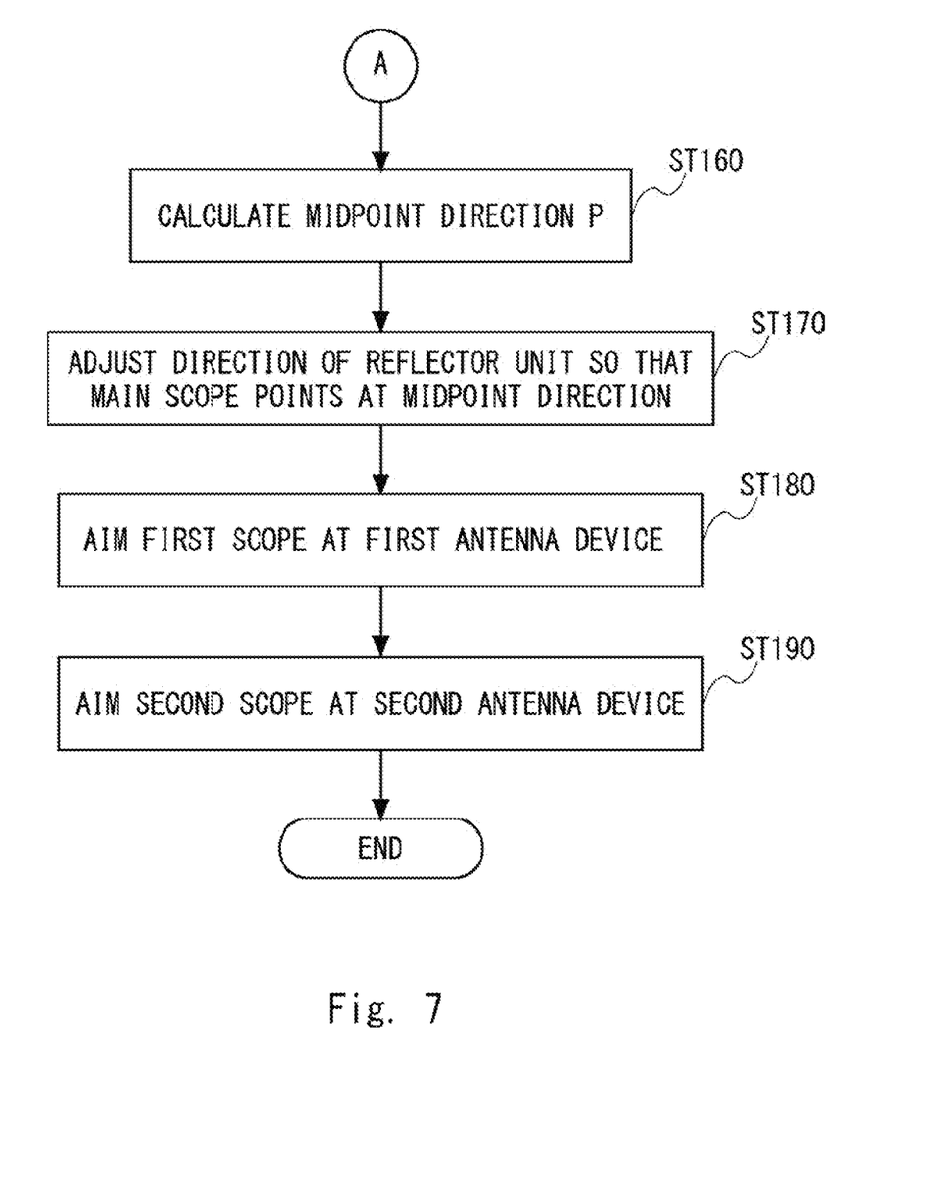
FIG. 7 is a flowchart showing an installation procedure of the radio wave reflection device.

FIGS. 6 and 7 are flowcharts showing the installation procedure of the radio wave reflection device 200.

Figure 8:
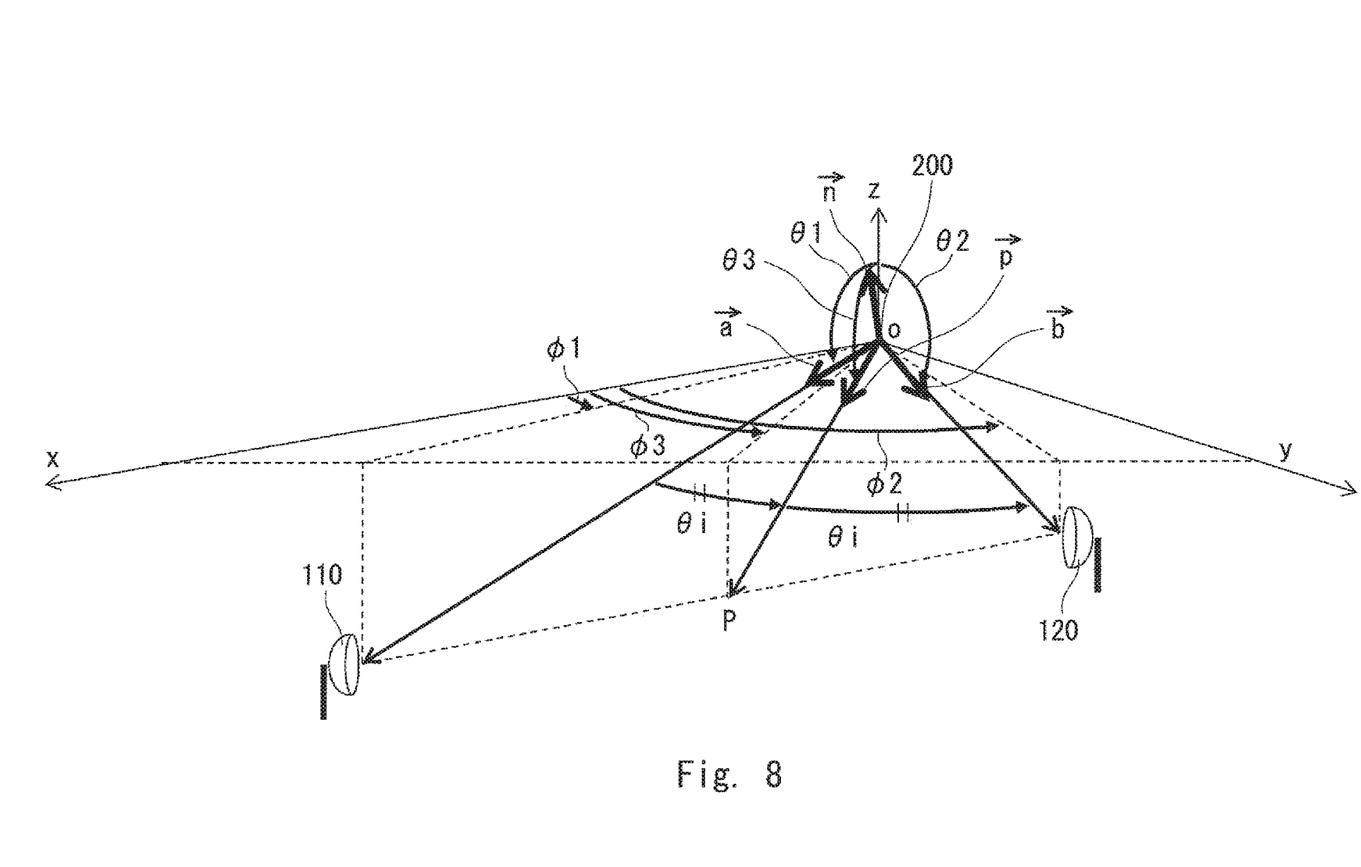
FIG. 8 is a view illustrating parameters.

FIG. 8 illustrates parameters for reference.

First, the radio wave reflection device 200 is attached to the pole 20 (ST110). Because various directions will be measured later, for easy and intuitive understanding, the AZ axis of the joint unit 220 is set along the vertical direction and the EL axis is set along the horizontal direction. Then, the reference marks 242 and 251 point at 0° (zero) of the angle scale 233 and the angle scale 247. In this state, the vertical direction is along the z axis, and the horizontal direction is at the elevation angle of 90°. Thus, the elevation angle is measured as an angle with respect to the vertical direction (z axis). A direction at the azimuth angle of 0° (zero) is not particularly limited. An arbitrary direction may be set as a direction at the azimuth angle of 0° (zero), which serves as a reference for azimuth angle measurement.

The direction at the azimuth angle of 0° (zero) is the x axis. The azimuth angle is measured as an angle with respect to the x axis.

Next, the main scope 370 is aimed at the first antenna device 110 (ST120). At this time, rotation occurs around the AZ axis and the EL axis of the joint unit 220. Accordingly, the values of the angle scale 233 and the angle scale 247 indicate the direction of the first antenna device (ST130). A unit vector indicating the direction of the first antenna device from the origin at the position of the radio wave reflection device 200 is referred to as a vector a. (Although it is desirable in fact to display an arrow (→) above the symbol "a" of the vector a or display "a" in bold type, it is not possible to do so due to the limits of the display function. Please be aware of the meaning and read it appropriately.) The direction of the first antenna device 110 (vector a) is represented in three-dimensional polar coordinates (spherical coordinates). It is assumed that an angle from the z axis is θ1, and an angle from the x axis is φ1.

$$a=(1, \theta 1, \varphi 1)$$

Likewise, the main scope 370 is aimed at the second antenna device 120 (ST140). Then, the direction of the second antenna device 120 (vector b) is measured (ST150). The direction of the second antenna device 120 (vector b) is represented by an angle θ2 from the z axis and an angle φ2 from the x axis.

$$b=(1, \theta 2, \varphi 2)$$

The directions of the first antenna device 110 and that of the second antenna device 120 are now known. In other words, the plane of incidence defined by the first antenna device 110, the second antenna device 120 and the radio wave reflection device 200 is obtained. The next thing is to make the main axis line L of the reflector unit 300 perpendicular to the plane of incidence.

Although there are various methods for making the main axis line L of the reflector unit 300 perpendicular to the plane of incidence, a method that points the reflector unit at the direction of the midpoint is described in this example. The midpoint direction is a coined expression in this specification which means the direction of the midpoint P between the first antenna device 110 and the second antenna device 120.

Because the direction of the first antenna device 110 (vector a) and the direction of the second antenna device 120 (vector b) are already obtained, a unit vector p (vector p) in the midpoint direction is calculated as follows (ST160).

$$p=(a+b)/|a+b|$$

It is assumed that, as the midpoint direction p, an angle θ3 from the z axis and an angle φ3 from the x axis are obtained. The direction of the reflector unit 300 is aligned in the midpoint direction by using the angle scale 247 and the angle scale 233 (ST170). Consequently, the main axis line L of the reflector unit 300 becomes perpendicular to the plane of incidence. The angle of the joint unit 220 is fixed in this state.

After that, the first scope 371 is aimed at the first antenna device 110 (ST180). Then, the first reflector 350 is turned in the direction of the first antenna device 110. Further, the second scope 372 is aimed at the second antenna device 120 (ST190). Then, the second reflector 360 is turned in the direction of the second antenna device 120. The first support shaft 330 and the second support shaft 340 are fixed in this state.

It is thereby possible to relay radio waves between the first antenna device 110 and the second antenna device 120 by the reflection of the radio wave reflection device 200.

Radio waves from the first antenna device 110 enter the first reflector 350.

Because the first reflector 350 is pointed in the direction of the first antenna device 110 at this time, the angle of incidence when the radio waves from the first antenna device 110 enter the first reflector 350 is 45°.

The radio waves reflected by the first reflector 350 enter the second reflector 360. The angle of incidence when the radio waves enter the second reflector 360 is also 45°. The radio waves are reflected by the second reflector 360. Because the second reflector 360 is pointed in the direction of the second antenna device 120, the radio waves reflected by the second reflector 360 enters the second antenna device 120. (The same applies to the case where radio waves are emitted from the second antenna device 120 and received by the first antenna device 110.)

The following effects are obtained according to the above-described first exemplary embodiment.

(1) The reflector consists of two plates: the first reflector 350 and the second reflector 360, which can rotate independently of one another.

Thus, by pointing the first reflector 350 at the first antenna device 110 and pointing the second reflector 360 at the second antenna device 120, it is possible to reflect radio waves at a sufficiently high reflection intensity. In this exemplary embodiment, the first reflector 350 and the second reflector 360 are each tilted at 45° with respect to the support shafts (330 and 340), and therefore the angle of incidence of each radio wave is 45°. Even if radio waves are not sharply incident on the "radio wave reflection device 200" (the angle of incidence is large), this does not cause any problem in this exemplary embodiment since the orientations of the first reflector 350 and the second reflector 360 are independently adjustable. Therefore, the radio wave reflection device can relay radio waves at a sufficient reflection intensity regardless of the arrangement of the first antenna device 110, the second antenna device 120 and the radio wave reflection device 200.

(2) The mounting unit 210 and the reflector unit 300 are connected by the joint unit 220 having rotational freedom along two axes. It is thereby possible to adjust the posture (orientation) of the reflector unit 300 after attaching the radio wave reflection device 200 to the pole 20.

(3) Because the joint unit 220 is provided with the angle scales 233 and 247, it is possible to measure the posture (angle) of the reflector unit. Further, because the main scope 370 sequentially is aimed at the first antenna device 110 and the second antenna device 120, it is possible to measure the directions of the first antenna device 110 and that of the second antenna device 120 from the radio wave reflection device 200. In this manner, because the joint unit 220 is provided with the angle scales 233 and 247 and further is provided with the main scope 370, it is easy to make the main axis line L of the reflector unit 300 perpendicular to the plane of incidence.

(4) Further, it is provided with the first scope 371 and the second scope 372, it is easy to point the first reflector 350 at the first antenna device 110 and point the second reflector 360 at the second antenna device 120 by aiming the scopes 371 and 382.

Alternative Example 1

In the above-described first exemplary embodiment, the direction of the reflector unit 300 is aligned in the midpoint direction in ST170. However, it is not necessary to set the direction of the reflector unit 300 in the midpoint direction, as the most important point is to make the main axis line L of the reflector unit 300 perpendicular to the plane of incidence. Therefore, a normal vector n of the plane of incidence may be calculated, and the posture (angle) of the reflector unit 300 may be adjusted so that the main axis line L coincides with the normal vector n. Note that the normal vector n of the plane of incidence is calculated by the outer product of the vector a and the vector b (a×b).

Alternative Example 2

Figure 9:
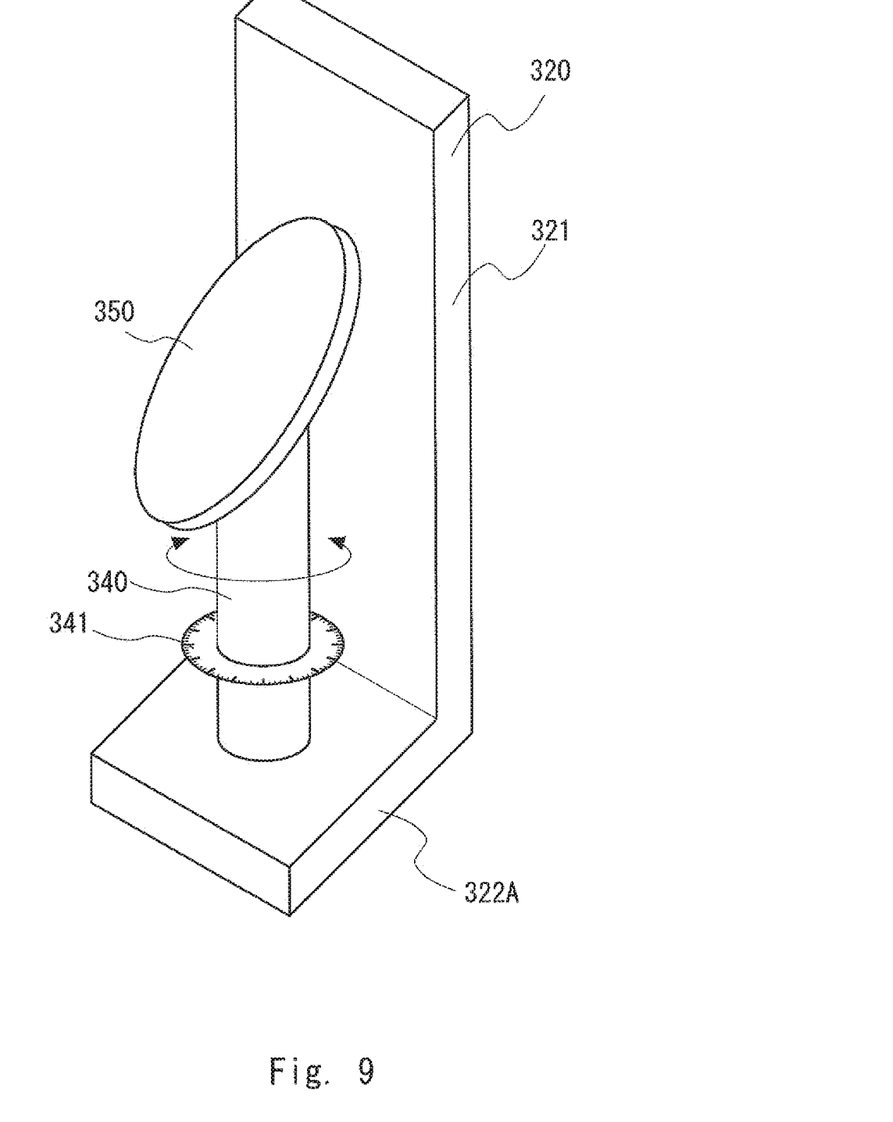
FIG. 9 is a view exemplifying an angle meter attached to a support shaft.

In the above-described first exemplary embodiment, the first scope 371 is mounted on the first support shaft 330, and the second scope 372 is mounted on the second support shaft 340. In place of the first scope and the second scope, an angle meter may be mounted on each of the first support shaft 330 and the second support shaft 340. FIG. 9 shows an angle meter 341 by way of illustration. In FIG. 9, the angle meter 341 for measuring a rotational angle is mounted on the second support shaft. Because the direction of the second antenna device 120 (vector b) is already measured (ST150), it is possible to point the second reflector 360 at the second antenna device 120, while checking the scale of the angle meter 341. (Because the azimuth angle of the joint unit 220 is added, it is necessary to subtract that value as a matter of course.)

Alternative Example 3

In order to enhance the visibility by the scopes 370, 371 and 372, visible light may be emitted from the first antenna device 110 and the second antenna device 120. The visible light may be flashing laser light, which is a so-called searchlight, or the like.

Second Exemplary Embodiment

Figure 10:
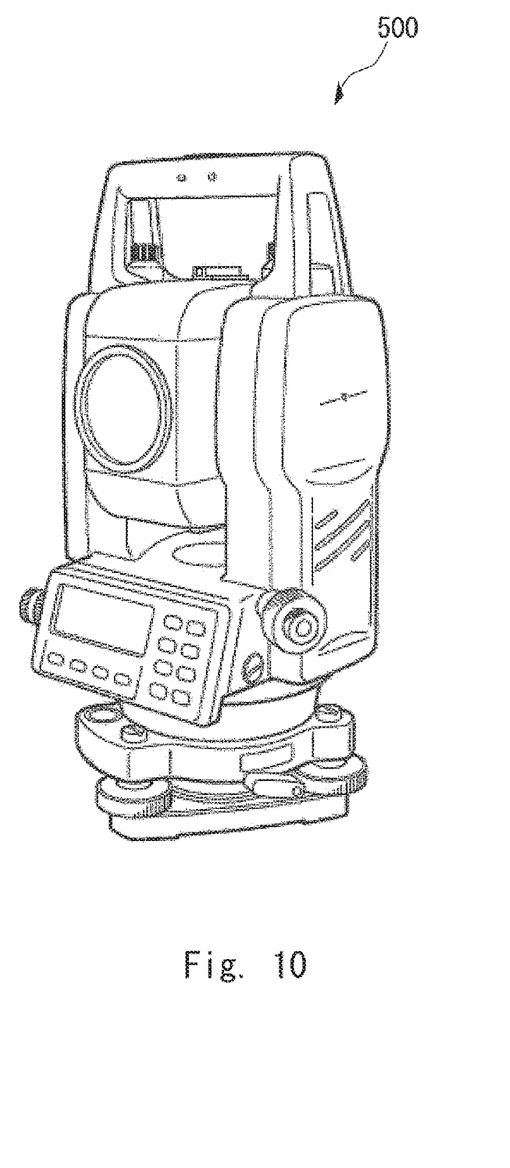
FIG. 10 is a view exemplifying a theodolite.

In the above-described first exemplary embodiment, the joint unit 220 is provided with the angle scales 233 and 247 to read the angle of the joint unit 220. In a second exemplary embodiment, the case of measuring an angle using another device without providing the radio wave reflection device 200 with an angle measurement function is described. As an angle measurement device, a theodolite 500 as shown in FIG. 10 is known, for example.

The directions of the first antenna device 110 and the second antenna device 120 are measured using the theodolite 500. The vector a and the vector b are thereby obtained. The midpoint direction p is calculated from the vector a and the vector b.

After obtaining the midpoint direction p, an object that exists when viewing the midpoint direction p from the radio wave reflection device 200 is specified. When the main scope 370 aims at the object, the reflector unit 300 turns to the midpoint direction p, and the main axis line L becomes perpendicular to the plane of incidence at the same time. After that, the first scope 371 aims at the first antenna device 110 (ST180), and the second scope 372 aims at the second antenna device 120 (ST190).

According to this structure, there is no need to put an angle scale on the joint unit. This increases the range of choice for the joint unit, such as a universal joint.

Note that, in the second exemplary embodiment also, it is not necessary to point the reflector unit 300 at the midpoint direction p as long as the main axis line L is perpendicular to the plane of incidence. It is only necessary to specify an object that will be viewed by the main scope 370 when the main axis line L becomes perpendicular to the plane of incidence and make the main scope 370 aim at that object.

Third Exemplary Embodiment

Figure 11:
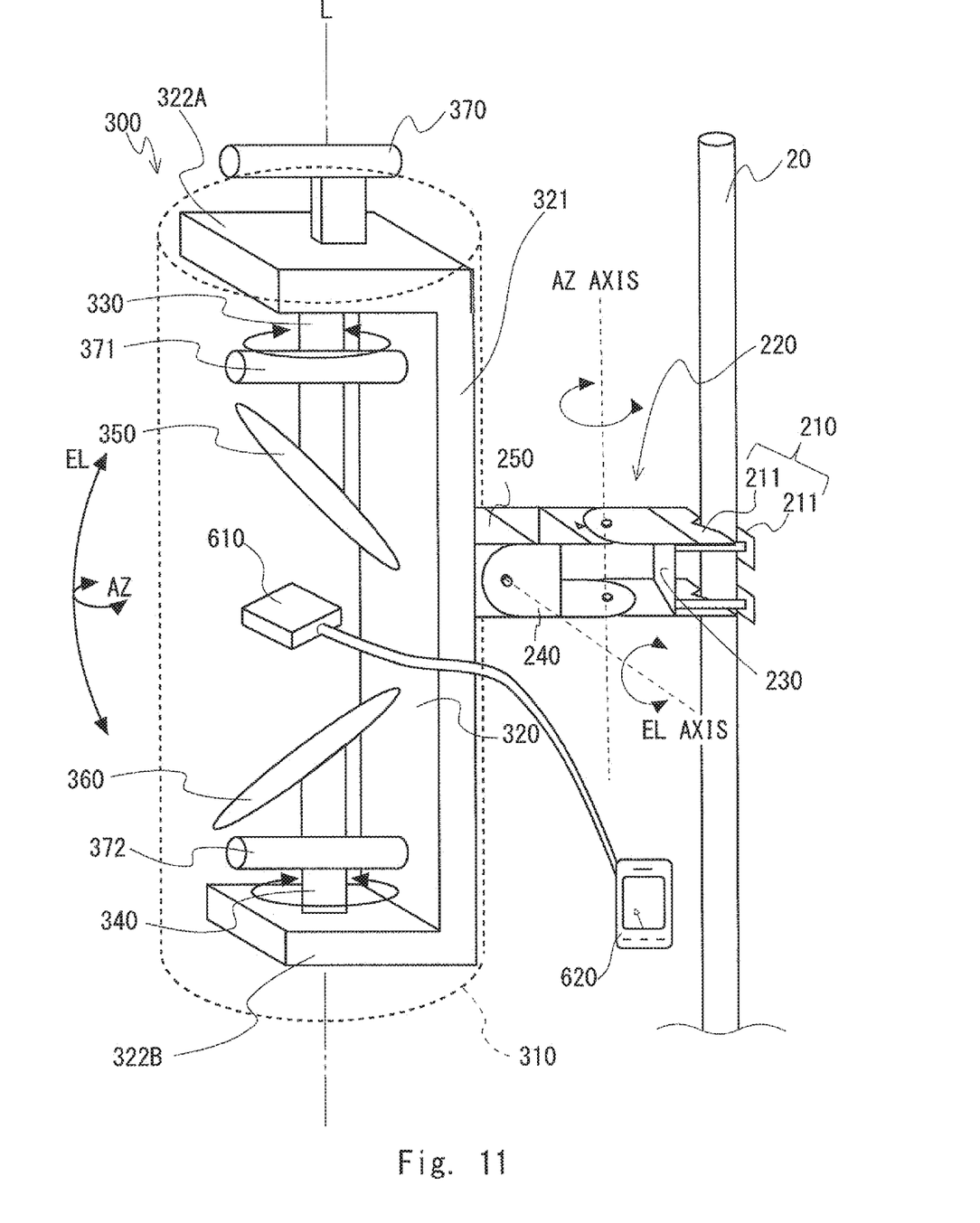
FIG. 11 is a view showing the way of adjusting the orientation of a reflector with laser light.

In the above-described exemplary embodiment, the aiming of the first scope 371 is used to point the first reflector at the first antenna device 110 (ST180). Besides, it is feasible to emit laser light from the first antenna device 110 to the radio wave reflection device 200, and seek the orientation at which the reflection intensity of the laser light reaches its maximum, rotating the first reflector 350. As shown in FIG. 11, a light receiving unit 610 is placed directly below the first reflector 350, and the reception intensity is measured by a measuring unit 620. (The same applies for the second reflector 360.) This eliminates the need to mount the scope on the first support shaft 330 or the second support shaft 340.

Fourth Exemplary Embodiment

In the above-described exemplary embodiment, it is assumed that the angle (posture) adjustment of the joint unit 220 and the support shafts 330 and 340 is made manually by a person.

In a fourth exemplary embodiment, the semi-automation of the direction adjustment process in the radio wave reflection device is studied.

Consider the automation of the aiming of the main scope 370, the first scope 371 and the second scope 372 (e.g. ST120, ST140, ST180, ST190).

A digital imaging function (CCD or CMOS) and an image processing function (image recognition function) may be incorporated to achieve this.

Then, it would be feasible to automate the measurement of the direction of the first antenna device 110 (vector a) and the direction of the second antenna device 120 (vector b) by means of emitting light from the antenna devices 110 and 120, for example.

Consider the automation of the detection of the angle (posture) (e.g. ST130, ST150).

To achieve this, a sensor (acceleration sensor, gyro sensor, rotary encoder) may be mounted on each of the support frame 320, the first support shaft 330 and the second support shaft 340. Alternatively, a sensor (rotary encoder) may be mounted on each rotational axis (AZ axis, EL axis) of the joint unit 220.

Consider the automation of the adjustment of the angle (posture) of the first reflector and the second reflector. To achieve this, a motor may be incorporated into each of the rotational axes (AZ axis, EL axis) of the joint unit 220, the first support shaft 330 and the second support shaft 340.

Because an algorithm has become apparent from the above description, it will be possible to create a computer program that automates the direction adjustment in the radio wave reflection device and cause a computer to implement this program.

The computer may be a typical computer including CPU, ROM and RAM, or a computer with dedicated hardware composed of various logic elements for the respective functional units. A direction adjustment program for a radio wave reflection device can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Summary

Because a plurality of exemplary embodiments and alternative examples are described above, a procedure necessary to install the radio wave reflection device is summarized below.

There are broadly two things to be adjusted for installing the radio wave reflection device.

(Step 1) Make the main axis line of the reflector unit perpendicular to the plane of incidence.

(Step 2) Point the first reflector and the second reflect respectively at the first antenna device 110 and the second antenna device 120.

For the above Step 1, the following steps are required.

(Step 1.1) Calculate the plane of incidence.

(Step 1.2) Adjust the angle so that the main axis line coincides with the normal to the plane of incidence Further, for Step 1.1, the following step is required.

(Step 1.1.1) Measure the direction of the first antenna device 110 (vector a) and the direction of the second antenna device 120 (vector b).

There are the following variations for the above Step 1.1.1

(Step 1.1.1A) Make the main scope aim at the antenna devices 110 and 120 and read the angle.

(Step 1.1.1B) Measure the directions of the antenna devices 110 and 120 by another equipment such as a theodolite.

There are the following variations for the above Step 1.2

(Step 1.2A) Calculate the normal to the plane of incidence from the vector a and the vector b and adjust the angle of the joint unit 220 so that the main axis line coincides with the normal (Step 1.2B) Calculate the midpoint direction from the vector a and the vector b and adjust the angle of the joint unit 220 so that the reflector unit points at the midpoint direction.

There are the following variations for the above Step 2.

(Step 2A) Aim at the first antenna device 110 and the second antenna device 120 respectively using the first scope 371 and the second scope 372.

(Step 2B) Mount an angle meter on the first support shaft 330 and the second support shaft 340 and adjust the angle.

(Step 2C) Receive laser light from the first antenna device 110 and the second antenna device 120 and set it in the direction to maximize the reception intensity.

It should be noted that the present invention is not limited to the above-described exemplary embodiment and may be varied in many ways within the scope of the present invention.

This application is based upon and claims the benefit of priority from Japanese patent application No. 2013-269028, filed on Dec. 26, 2013, the disclosure of which is incorporated herein in its entirety by reference.

REFERENCE SIGNS LIST

10 OBSTACLE
20 POLE
100 COMMUNICATION SYSTEM
110 FIRST ANTENNA DEVICE
120 SECOND ANTENNA DEVICE
200 RADIO WAVE REFLECTION DEVICE

210 MOUNTING UNIT
220 JOINT UNIT
230 FIXED PART
231 SUPPORT PIECE
232 HOLE
240 ROTATING PART
241 COUPLING PIECE
242 REFERENCE MARK
245 SUPPORT PIECE
246 HOLE
250 COUPLING UNIT
251 REFERENCE MARK
300 REFLECTOR UNIT
310 RADOME
320 SUPPORT FRAME
321 COLUMN
322A SUPPORT ARM
322B SUPPORT ARM
330 FIRST SUPPORT SHAFT
340 SECOND SUPPORT SHAFT
341 ANGLE METER
350 FIRST REFLECTOR
360 SECOND REFLECTOR
370 MAIN SCOPE
371 FIRST SCOPE
372 SECOND SCOPE
373 SCOPE
500 THEODOLITE
610 LIGHT RECEIVING UNIT
620 MEASURING UNIT

The invention claimed is:

1. A radio wave reflection device that relays, by reflection, radio communications between a first antenna device and a second antenna device distant from each other, comprising:
   a mounting unit that securely mounts the radio wave reflection device on a stable installation place;
   a reflector unit that holds two reflectors; and
   a joint unit that connects the reflector unit and the mounting unit, wherein
   the two reflectors are respectively held at a specified tilt angle with respect to support shafts, have reflective surfaces facing each other, are coaxial with each other, and at least one of the two reflectors is rotatable about the support shaft, and
   the joint unit has rotational freedom along two axes orthogonal to each other.

2. The radio wave reflection device according to claim 1, wherein the two reflectors are respectively held at a tilt angle of 45° with respect to the support shafts.

3. The radio wave reflection device according to claim 1, further comprising:
   an angle measurement means that measures an elevation angle and an azimuth angle of the reflector unit, wherein
   a main scope that is displaced together with the reflector unit can be attached to the reflector unit.

4. The radio wave reflection device according to claim 3, wherein the angle measurement means is an angle scale for reading a rotational angle of each rotational axis of the joint unit.

5. The radio wave reflection device according to claim 3, wherein the angle measurement means is one of an acceleration sensor and a gyro sensor incorporated into the reflector unit.

6. The radio wave reflection device according to claim 1, wherein a scope can be attached to a rotating support shaft of each of the two reflectors.

7. The radio wave reflection device according to claim 1, wherein an angle scale for reading a rotational angle is placed on a rotating support shaft of each of the two reflectors.

8. A method for installing a radio wave reflection device that relays, by reflection, radio communications between a first antenna device and a second antenna device distant from each other, the radio wave reflection device including a mounting unit that securely mounts the radio wave reflection device on a stable installation place, a reflector unit that holds two reflectors at a tilt angle of 45° and which reflectors are coaxial and rotatable independently of each other, and a joint unit that connects the reflector unit to the mounting unit and has rotational freedom along two axes orthogonal to each other, the method comprising:
   measuring a direction of the first antenna device and a direction of the second antenna device;
   specifying a plane of incidence defined by the first antenna device, the second antenna device and the radio wave reflection device;
   adjusting an angle of the joint unit so that a normal to the plane of incidence and a rotational axis of the two reflectors coincide with each other; and
   pointing the two reflectors respectively in the direction of the first antenna device and the direction of the second antenna device.

* * * * *